(12) United States Patent
Shenoy et al.

(10) Patent No.: US 11,546,411 B1
(45) Date of Patent: Jan. 3, 2023

(54) BACKING UP CONFIDENTIAL DATA TO USER DEVICES ON THE SAME LOCAL NETWORK

(71) Applicant: VMWARE, INC., Palo Alto, CA (US)

(72) Inventors: Pranav Ashok Shenoy, Bangalore (IN); Mohammed Lazim, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/409,853

(22) Filed: Aug. 24, 2021

(30) Foreign Application Priority Data

Jul. 10, 2021 (IN) .............................. 202141031054

(51) Int. Cl.
| | | |
|---|---|---|
| *G06F 15/16* | (2006.01) | |
| *H04L 67/06* | (2022.01) | |
| *H04L 67/1097* | (2022.01) | |
| *H04L 9/14* | (2006.01) | |
| *H04L 9/08* | (2006.01) | |
| *H04L 67/306* | (2022.01) | |

(52) U.S. Cl.
CPC ............ *H04L 67/06* (2013.01); *H04L 9/0825* (2013.01); *H04L 9/14* (2013.01); *H04L 67/1097* (2013.01); *H04L 67/306* (2013.01)

(58) Field of Classification Search
CPC ......... H04L 67/06; H04L 9/0825; H04L 9/14; H04L 67/1097; H04L 67/306
USPC .................. 709/217, 218, 219, 223, 246
See application file for complete search history.

(56) References Cited

U.S. PATENT DOCUMENTS

| | | | |
|---|---|---|---|
| 2010/0169595 A1* | 7/2010 | Bryant-Rich | G06F 11/1458 711/171 |
| 2011/0246427 A1* | 10/2011 | Modak | G06F 11/1469 707/705 |
| 2021/0133298 A1* | 5/2021 | Andrews | H04L 63/1425 |
| 2021/0133329 A1* | 5/2021 | Andrews | G06F 9/45558 |
| 2021/0351929 A1* | 11/2021 | Palanisamy | H04L 63/104 |

* cited by examiner

*Primary Examiner* — Liang Che A Wang
(74) *Attorney, Agent, or Firm* — Clayton, McKay & Bailey, PC (57) ABSTRACT

Systems and methods are described for backing up confidential data using user devices on the same local network. In an example, a first user device can download a data file from a server. The first user device can connect to the server on the same local network as a second user device. A user can select to delete the file from the first user device. The first user device can send the data file to the second user device using a local Internet Protocol ("IP") address of the second user device. The second user device can store the data file on its local storage. If the user chooses to retrieve the data file to the first user device again, and if the user devices are on the same local network, the first user device can retrieve the data file from the second user device instead of the server.

17 Claims, 6 Drawing Sheets

BACKING UP CONFIDENTIAL DATA TO USER DEVICES ON THE SAME LOCAL NETWORK

RELATED APPLICATION

Benefit is claimed under 35 U.S.C. 119(a)-(d) to Foreign Application Serial No. 202141031054 filed in India entitled "BACKING UP CONFIDENTIAL DATA TO USER DEVICES ON THE SAME LOCAL NETWORK", on Jul. 10, 2021, by VMware, Inc., which is herein incorporated in its entirety by reference for all purposes.

BACKGROUND

Enterprises sometimes use device managements systems, such as a Unified Endpoint Management ("UEM") system, to secure and control certain aspects of user devices of employees. Some UEM systems include a feature or application that allows users to securely view confidential documents. The user can open a corresponding application, locate a file to view, and select the file, which causes a server of the UEM system to download the file to the user device.

Sometimes these files can be very large, amounting to hundreds of megabytes or even gigabytes of data. Downloading such files requires a significant amount of enterprise computing and network resources. To make this problem worse, user often download these files to a user device with limited storage space, such as a smart phone or tablet. Due to the file's size, users often delete the file from the device and redownload it when they need it again. This places excessive strain on the enterprise computing and network resources repetitively providing the same large files to the same user devices.

As a result, a need exists for backing up files of user devices with a minimal impact on enterprise network and computing resources.

SUMMARY

Examples described herein include systems and methods for backing up confidential data using user devices on the same local network. In an example, a user can enroll multiple user devices with a management server. For example, the management server can be one or more servers of an enterprise UEM system that manages user devices enrolled in the system. The user can download an enterprise-related data file to a first enrolled user device. Some time later, the user can select to delete the data file from the first user device.

Instead of deleting the data file, the first user device can determine whether a second user device enrolled with the user's profile is connected to the same local network. This determination can occur in response to the user selecting to delete the file or at some time before, such as when the user initially connects to the management server on the local network or when the user launches an application on the first user device that allows the user to delete an enterprise data file. In one example, the first user device can obtain the local Internet Protocol ("IP") address of the second user device from the management server so that the first user device can send the data file to the second user device.

In an example, the first user device can receive an encryption key associated with the second user device, such as a public key in an encryption key pair generated by the second user device. The encryption key can be provided by the management server or the second user device, and it can be provided to the first user device at any time between the user devices being enrolled and the user selecting to delete the data file.

In an example, the first user device can encrypt the data file using the second user device's public encryption key and then send the data file to the second user device over the local network using the local IP address. The second user device can decrypt the data file and store it in a secure location on its local storage. The file can be stored in an additional encrypted state, such as on an encrypted portion of memory on the second user device, maintaining document security in an example.

If the user later decides to download the data file on the first user device, or download the data file to another user device, the data file can be retrieved from the second user device is the two user devices are again connected on the same local network. For example, the first and second user devices can be again connected to a same local network, which can be the same or a different local network described previously. When the user selects to download the file again, instead of downloading the data file from the management server, the first user device can request the data file from the second user device. In one example, the second user device can check the version of the data file with the management server to ensure the version saved to the second user device is current. If it is current, the second user device can send the data file to the first user device over the local network. In one example, the second user device can first decrypt the file from the additional encryption state and re-encrypt the file using a public key of the first user device.

The methods described herein can allow a user to distribute, back up, delete, and retrieve data files using his or her own managed user devices and local network resources instead of reusing enterprise network and computing resources for a repetitive task. This can free up important enterprise network and computing resources to perform more important functions.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for backing up confidential data using user devices on the same local network. In an example, a first user device can download a data file from a management server. The first user device can connect to the management server on the same local network as a second user device. A user can select to delete the file from the first user device. The first user device can receive a local IP address and an encryption key of the second user device. The first user device can encrypt the data file and send it to the second user device on the local network. The second user device can store the data file on its local storage. In an instance where the user wishes to retrieve the data file to the first user device again, and if the user devices are on the same local network, the first user device can request the data file from the second user device instead of the management server. The second user device can encrypt the data file using a public key of the first user device and send the encrypted data file to the first user device on the local network.

Figure 1:
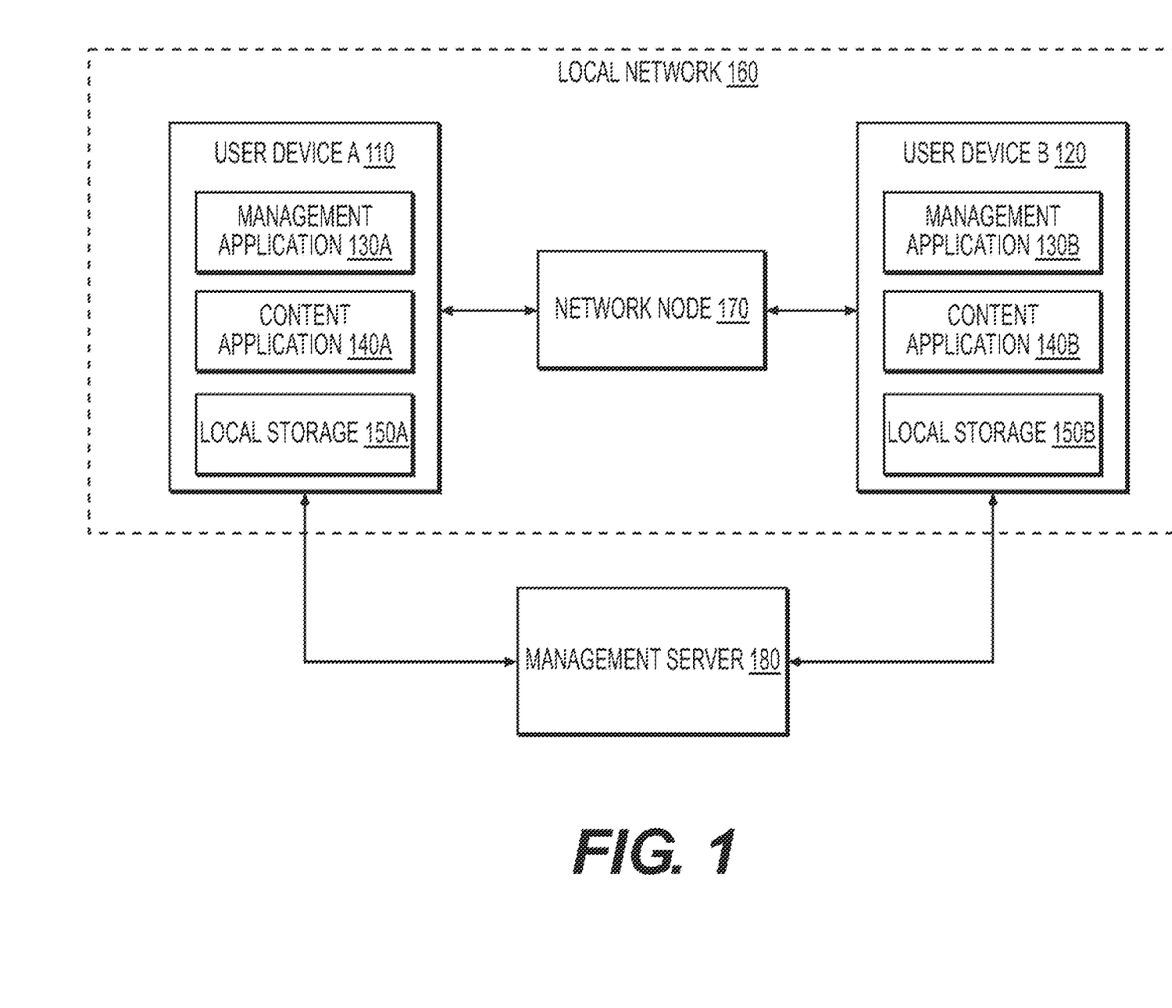
FIG. 1 is an illustration of an example system for backing up confidential data using user devices on the same local network.

FIG. 1 is an illustration of a system for backing up confidential data using user devices on the same local network. The system can include two user devices, user device A 110 and B 120 that are connected to a local network 160. The local network 160 can include two or more devices connected to each other whereby they can exchange electronic communications. For example, the local network 160 can include a local area network ("LAN"), a wireless local area network ("WLAN"), a virtual private network ("VPN") internet connection, or two or more devices connected directly, such as through BLUETOOTH or WIFI. The user devices A 110 and B 120 can be one or more processor-based devices, such as a personal computer, tablet, or smart phone. The local network 160 can be a network of interconnected devices managed by a network node 170. The network node 170 can be one or more network devices that manages network traffic and connections between devices on the local network 160 as well as external traffic, such as managing and distributing incoming and outgoing Internet traffic for devices on the local network 160. As an example, the network node 170 can be a network switch or a wireless router.

In an example, the user devices A 110 and B 120 can include a management applications 130A and 130B respectively, a content applications 140A and 140B, and a local storages 150A and 150B. The concepts described herein regarding the management application 130A, the content application 140A, and the local storage 150A can apply to the management application 130B, the content application 140B, and the local storage 150B respectively. For example, concepts regarding the management application 130A in relation to the user device A 110 can apply to the management application 130B in relation to the user device B 120, and so on.

The management application 130A can be a stand-alone application, part of an enterprise application, or part of an operating system of the user device A 110. The management application 130A can be part of an enterprise UEM system that includes a management server 180 that manages and secures user devices that are enrolled with the enterprise. The management server 180 can be a single server or a group of servers, including multiple servers implemented virtually across multiple computing platforms. In an example, the management application 130A can be responsible for ensuring that user devices are up to date with compliance and security settings prior to accessing enterprise data and resources. The management application 130A can communicate with the management server 180, allowing UEM management of user devices A 110 and B 120 based on compliance and security settings at the management server 180. The management application 130A can enforce compliance at the user devices A 110 and B 120, such as by wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources. In one example, the user devices A 110 and B 120 can access enterprise or UEM resources through the management server 180.

In an example, the content application 140A can be a managed application. A managed application can allow an enterprise to control access and functionality of the application. The content application 140A can manage enterprise-related data files, such as application files, UEM policy files, and user files. Additionally, a managed application can persist locally on the user devices A 110 and B 120, or can be accessed from within the management application 130, depending on the example. Even when the content application 140A is accessed remotely, portions of the content application 140A or data utilized by the content application 140A can exist locally on the user device A 110. Local resources can be encrypted and decrypted for use by the management application 130A, content application 140A, or some other process of the UEM. In one example, the content application 140A can be a managed application that manages some or all enterprise content on the user devices A 110 and B 120. In an alternative example, managed applications on the user devices A 110 and B 120 can be responsible for managing their own respective content, and the content application 140A can be one or more of such applications, such as a managed email or accounting application.

The local storages 150A can be a local storage component of the user device A 110. For example, the local storage 150A can include a hard drive or random-access memory ("RAM"). In one example, the management application 130A can have rights to manage a portion of the local storage 150A. For example, the management application 130A can encrypt a portion of the local storage 150A so that any other applications or services on the user devices A 110 not managed by the UEM cannot access or read data on the managed portion.

In an example, the user device A 110 can include a private key A 190 and a public key B 192. The private key A 190 and public key A 192 can be an asymmetric encryption key pair generated by the user device A 110. Likewise, the user device B 120 can include a private key B 194 and a public key 196 that are an asymmetric encryption key pair generated by the user device B 120. In one example, the encryption key pairs can be generated by the management application 130. The public keys A 190 and B 194 can be shared with other devices so that other devices can encrypt data so that only their corresponding private key (private keys A 192 and B 196, respectively) can decrypt the data. This allows for secure communication between trusted devices.

In an example, the management server 180, or a content server associated with the management server 180, can provide enterprise-related content to the user devices A 110 and B 120. For example, when the user device A 110 or B 120 requests a data file, the management server 180 can encrypt the data file using the device's corresponding public key and send it to the user device. In another example, the management server 180 can send content over a secure channel, such as a virtual private network ("VPN") channel.

In an example, the management application 130A can be configured to back up data files to the user device B 120. For example, the user device A 110 can have less storage space on the local storage 150A than the local storage 150B of the user device B 120. When the user devices A 110 and B 120 are connected to the same local network, the management application 130A can backup enterprise data files to the user device B 120 to free up space on the user device A 110. In one example, when the user deletes an enterprise data file in the content application 140A, the management application 130A can instead encrypt the data file using the public key B 196 and send the encrypted data file to the user device B 120 over the local network 160. Then, if the user requests the file again, either from the user device A 110 or another user device of the user on the same local network 160 as the user device B 120, the management application 130A can retrieve the data file from the user device B 120 over the local network 160. This can allow a user to distribute, back up, delete, and retrieve data files using the local storage 150B of the user device B 120 and the network resources of the local network 160 instead of the enterprise network and computing resources of the management server 180. This can free up important enterprise network and computing resources for performing more important functions.

Figure 2:
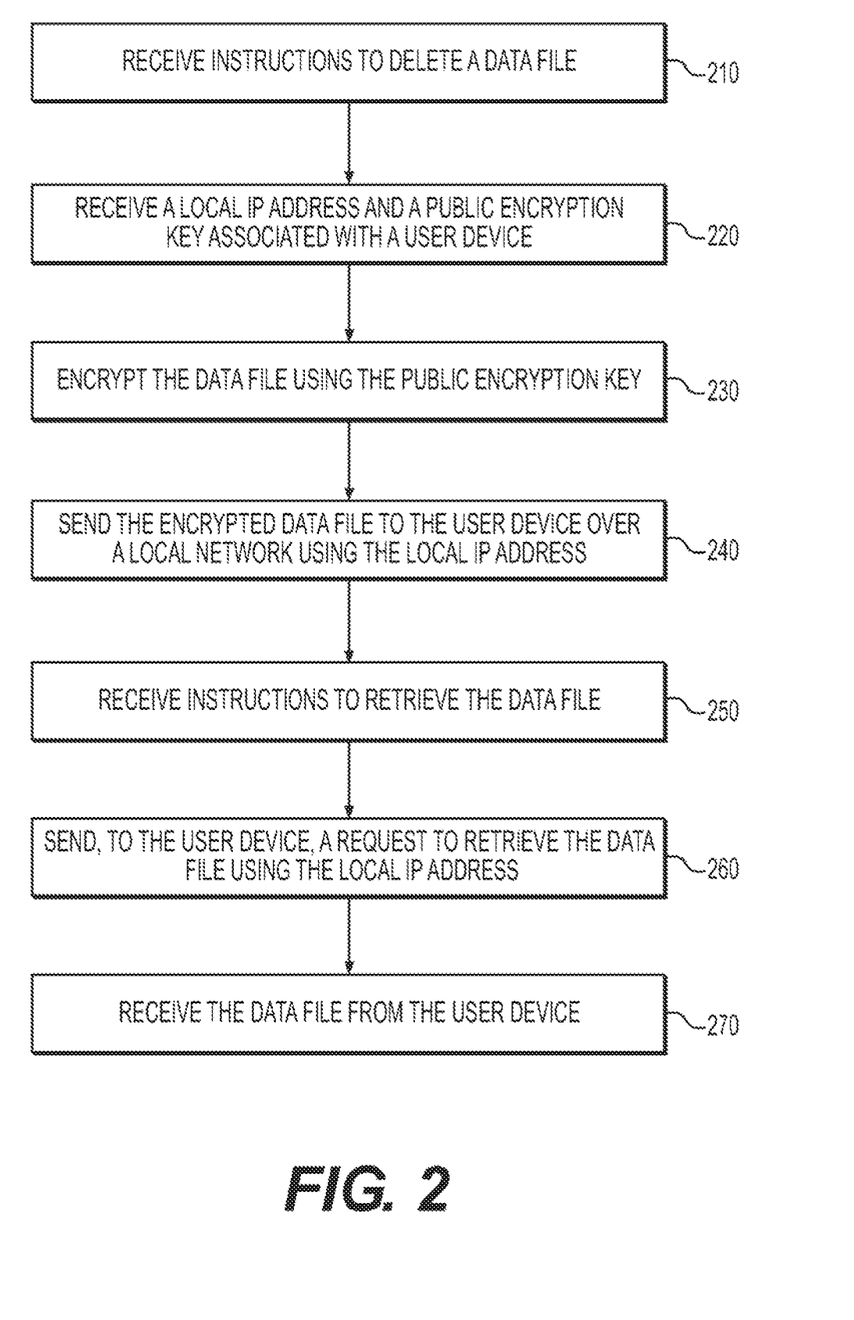
FIG. 2 is a flowchart of an example method for backing up confidential data using user devices on the same local network.

FIG. 2 is a flowchart of an example method for backing up confidential data using user devices on the same local network 160 and illustrates stages performed by the user device A 110. At stage 210, the user device A 110 can receive instructions to delete a data file. The data file can be any type of computer file, such as a .docx, .pdf, .mp4, .exe, or .jpg file. Although references are made herein to deleting the data file, those references are merely used as examples and are not intended to be limiting in any way. For example, deleting the data file can encompass any removal or transmittance of the data file, such as backing up the data file. The data file can be a data file that the user device A 110 previously downloaded from the management server 180. In one example, the data file can be stored on the local storage 150A and managed by the content application 140A. In an example, the instructions to delete the data file can be received from user input. For example, the user of the user device A 110 can open the content application 140A on the user device A 110, select the data file, and select a button for deleting the data file.

At stage 220, the user device A 110 can receive, from the management server, a local IP address and the public encryption key B 196 associated with the user device B 120. The local IP address can be the unique address that identifies the user device B 120 in the local network 160. For example, the user devices A 110 and B 120 can both be connected to the local network 160 through the network node 170, and the network node 170 can distribute IP addresses within the local network 160 to identify the devices. As an example, the local IP address of the user device A 120 can be 192.168.1.2 and the local IP address of the user device B can be 192.168.1.3. In an example, devices within the local network 160 can communicate with each other using these local IP addresses.

In an example, the user device A 110 can receive the local IP address and the public key B 196 of the user device B 120 from the management server 180. The management server 180 can provide the local IP address and the public key B 196 in response to the user device A 110 performing a predetermined action. One example of a predefined action can include the user launching the content application 140A. Another example can include the user selecting to delete the data file. Yet another example can include the user device A 110 connecting to the management server 180 through the local network 160. For example, when the user device A 110 connects to the management server 180 through the local network 160, the management server 180 can determine whether another user device enrolled with the user's profile is also connected to the local network 160. The management server 180 can then retrieve the local IP address of any such device and send it to the user device A 110. In one example, the management server 180 can retrieve the local IP address of the user device B 120 regardless of whether the user device A 110 performs a predetermined action, such as when the user device B 120 establishes a connection with the management server 180 through the local network 160.

In an example, the management server 180 can also retrieve the public key B 196 from the user device B 120. In one example, this can occur when the user device B 120 enrolls with the management server 180. For example, as part of the enrollment process, the user device B 120 can generate an asymmetrical encryption key pair with the private key B 194 and the public key B 196. The user device B 120 can store the private key B 194 in a secure location on the user device B 120 and provide the public key B 196 to the management server 180. In another example, the user device B 120 can send the public key B 196 to the management server 180 after enrollment. For example, the user device B 120 can send the public key B 196 to the management server 180 when it sends the local IP address. Although references are made herein to an asymmetrical encryption key pair, those references are merely used as examples and are not intended to be limiting in any way. For example, the asymmetrical encryption key pair can encompass any encryption type, such as asymmetrical keys or hash functions.

At stage 230, the user device A 110 can encrypt the data file using the public key B 196. For example, the user device A 110 can encrypt the data file using an asymmetric encryption algorithm like RSA or Elliptic Curve Cryptography ("ECC").

At stage 240, the user device A 110 can send the encrypted data file to the user device B 120 over the local network 160 using the local IP address. For example, the network node 170 can manage network traffic for the local network 160. The user device A 110 can send the encrypted data file to the network node 170 with the local IP address of the user device B 120 as the intended destination. The user device A 110 can send the encrypted data file wirelessly or over a wired connection, depending on how the user device A 110 is connected to the network node 170. The network node 170 can receive the encrypted data file and pass it to the user device B 120.

In an example, the user device B 120 can save the data file in its local storage 150B. The user device B 120 can save the data file as a backup in case the user wishes to later retrieve the data file on the user device A 110. For example, the local storage 150A on the user device A 110 can have much less storage space available than the local storage 150B on the user device B 120. For example, the user device A 110 can be a mobile device, such as a smart phone, and the user device B 120 can be a personal computer, such as a desktop or laptop. Because personal computers often have significantly more storage space available than mobile devices, when (or before) the user deletes the data file from the user device A 110, the data file can be saved to the user device B 120 in case the user decides to re-download the data file. This can preserve computing resources at the management server 180 for more important tasks.

In one example, the user device B 120 can decrypt the data file using the private key A 190 from the encryption key pair. The user device B 120 can then store the data file on a secure portion of the local storage 150B, such as an encrypted portion of the local storage 150B that is managed by the management application 130b or the content application 140b. In an example where a symmetric key is used, the user device B 120 can store the data file on the local storage 150B without decrypting the data file.

At stage 250, the user device A 110 can receive instructions to retrieve the data file. The instructions can be received from user input. For example, the user can select to download the data file again. In one example, in response, the user device A 110 can request the data file from the management server 180 and the management server 180 can redirect the user device A 110 to the user device B 120. For example, when the user deletes the data file, the user device A 110 can notify the management server 180 that it is send the data file to the user device B 120. Alternatively, the management server 180 can instruct the user device A 110 to send the data file to the user device B 120. In both examples, the management server 180 can record the location of the data file. When the user device A 110 requests the data file, the management server 180 can check the record and reply to the user device A 110 with the location of the data file at the user device B 120. In an alternative example, the user device A 110 can store a record indicating that the data file was sent to the user device B 120.

At stage 260, the user device A 110 can send a request for the data file to the user device B 120 using the local IP address. The local IP address used to request the data file can be the same or different from the local IP address used to send the data file at stage 240. For example, the network node 170 can dynamically assign IP addresses to devices that log onto the local network 160. If the user device B 120 disconnects from the local network 160 after receiving the data file and reconnects before the user device A 110 requests the data file, then the local IP address of the user device B 120 may have changed. In another example, the user can send the user can delete the data file while connected to one local network 160 but request it again while connected to a different local network 160. For example, the user can delete the data file while connected to his home network but request the data file again when at work. For at least these reasons, the management server 180 can record network information of the user's devices, including which network they are connected to and what their local IP addresses are. The management server 180 can update the user's devices with the network information of the other devices, particularly when they are connected to the same local network 160.

At stage 270, the user device A 110 can receive the data file from the user device B. In an example, the user device B 120 can encrypt the data file before sending it. For example, the user device B 120 can decrypt the data file using the private key A 190 after receiving it from the user device A 110. The user device B 120 can then encrypt the data file with the public key A 192 of the user device A before sending the data file. For example, like the user device B 120, the user device A 110 can also generate an encrypted key pair after enrolling. This encrypted key pair can be used to securely exchange information with trusted devices. In one example, the user devices associated with the user can exchange public keys after enrolling so that the user can securely transfer data between any of his or her user devices. In another example, the user device A 110 can send the public key A 192 to the user device B 120 with the request for the data file. The user device B 120 can then encrypt the data file using the public key A 192, thus allowing the user device A 110 to decrypt the data file upon receipt with the private key A 190.

In one example of the method described above, stages 250, 260, and 270 can be performed by a third user device ("user device C") that is also enrolled with the management server 180 with the user's profile. For example, the user can select to delete or backup a data file on user device A 110. The user device A 110 can encrypt the data file using the public key B 196 120 and send the encrypted data file to the user device B 120 on the local network 160. The user device B 120 can decrypt the data file using the private key B 194 and securely store the data file. The user device C can be connected to the same local network 160 as the user device B 120. The user can select to download the data file to the user device C. The management server 180 can provide the local IP address of the user device B 120 to the user device C. The user device C can then use the local IP address to request the data file from the user device B 120. The user device B 120 can encrypt the data file using a public key associated with the user device C, which it can have received from the management server 180 or the user device C. The user device B 120 can send the data file to the user device C, and then the user device C can decrypt the data file using its private key. This allows the user to backup or retrieve deleted data files across multiple user devices while using minimal resources from the management server 180.

Figure 3:
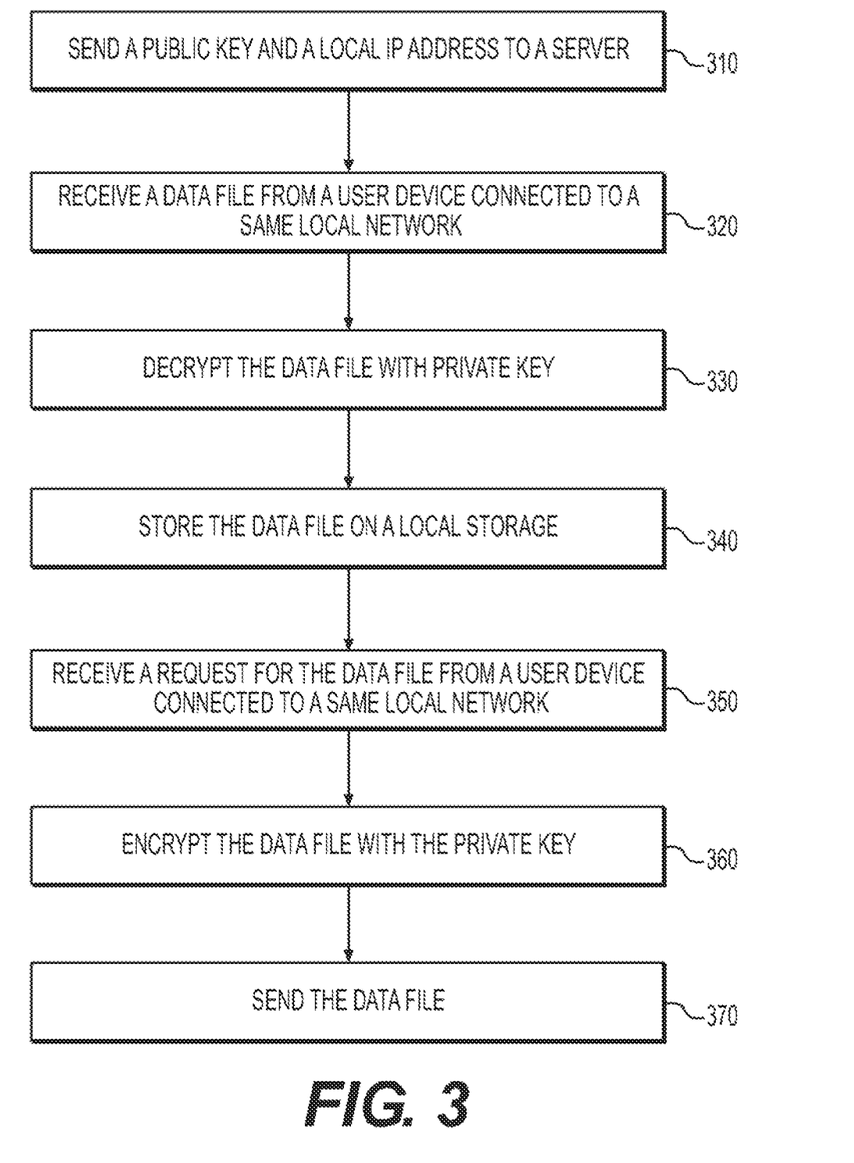
FIG. 3 is another flowchart of an example method for backing up confidential data using user devices on the same local network.

FIG. 3 is another flowchart of another example method for backing up confidential data using user devices on the same local network 160 and illustrates stages performed by the user device B 120. At stage 310, the user device B 120 can send the public key B 196 and its local IP address to the management server 180. The public key B 196 can be part of an encryption key pair generated by the user device B 120 as part of its enrollment. In one example, the management server 180 can maintain copies of public keys from enrolled user devices. The management server 180 can use the public keys to securely transfer data to the user devices, and it can also send the public keys to trusted user devices when necessary. For example, the management server 180 can send public key B 196 of the user device B 120 to other user devices enrolled under the user's profile, like the user device A 110.

As described earlier, the local IP address can be the unique address that identifies the user device B 120 in the local network 160. The user devices A 110 and B 120 can both be connected to the local network 160 so that they can use each other's local IP address to communicate directly. In one example, the user device B 120 can send its local IP address to the management server 180 when it connects to the management server 180. For example, the user can connect the user device B 120 to the local network 160 and launch the management application 130b or a managed application on the user device B 120. The management application 130b can contact the management server 180, such as part of a query for other information, and provide the local IP address.

At stage 320, the user device B 120 can receive a data file from the user device A 110 on the local network 160. For example, the user device A 110 can send the data file to the network node 170 with the local IP address of the user device B 120 as the intended destination. The user device B 120 can receive the data file wirelessly or over a wired connection, depending on how the user device B 120 is connected to the network node 170. The network node 170 can receive the data file from the user device A 110 and pass it to the user device B 120.

At stage 330, the user device B 120 can decrypt the data file with the private key B 194. For example, the user device A 110 can receive the public key B 196 and encrypt the data file using public key B 196. Where the encryption key pair is asymmetric, the private key B 194 is the only key that can be used to decrypt the data file.

At stage 340, the user device B 120 can store the data file on the local storage 150B. For example, the user device B 120 can store the data file on a secure portion of the local storage 150B, such as an encrypted portion of the local storage 150B that is managed by the management application 130B or the content application 140B. In an example where a symmetric key is used, the user device B 120 can store the data file on the local storage 150B without decrypting the data file.

At stage 350, the user device B 120 can receive a request for the data file from the user device A 110 on the local network 160. The local network 160 can be the same or different from the local network 160 discussed at stage 320. For example, the user device B 120 can receive the data file on a first local network 160, such as the user's home, and receive a request for the data file on a second local network, such as the user's work office. In an example, the user device B 120 can update the management server 180 with its local IP address and network information whenever it connects to the management server 180. The management server 180 can provide the updated network information to other user devices, such as the user device A 110, when needed.

At stage 360, the user device B 120 can encrypt the data file with the public key A 192 of the user device A 110. In one example, the user device A 110 can send public key A 192 he when it sends the request for the data file. In another example, the user device B 120 can already have the public key A 192 stored. In an example, the user device B 120 can encrypt the data file with the public key A 192 using an asymmetric encryption algorithm like RSA or ECC.

At stage 370, the user device B 120 can send the data file to the user device A 110. In an example, the user device A 110 can send its local IP address to the user device B 120 when it requests the data file. The user device B 120 can use the local IP address of the user device A 110 to send the request through the network node 170.

Figure 4A:
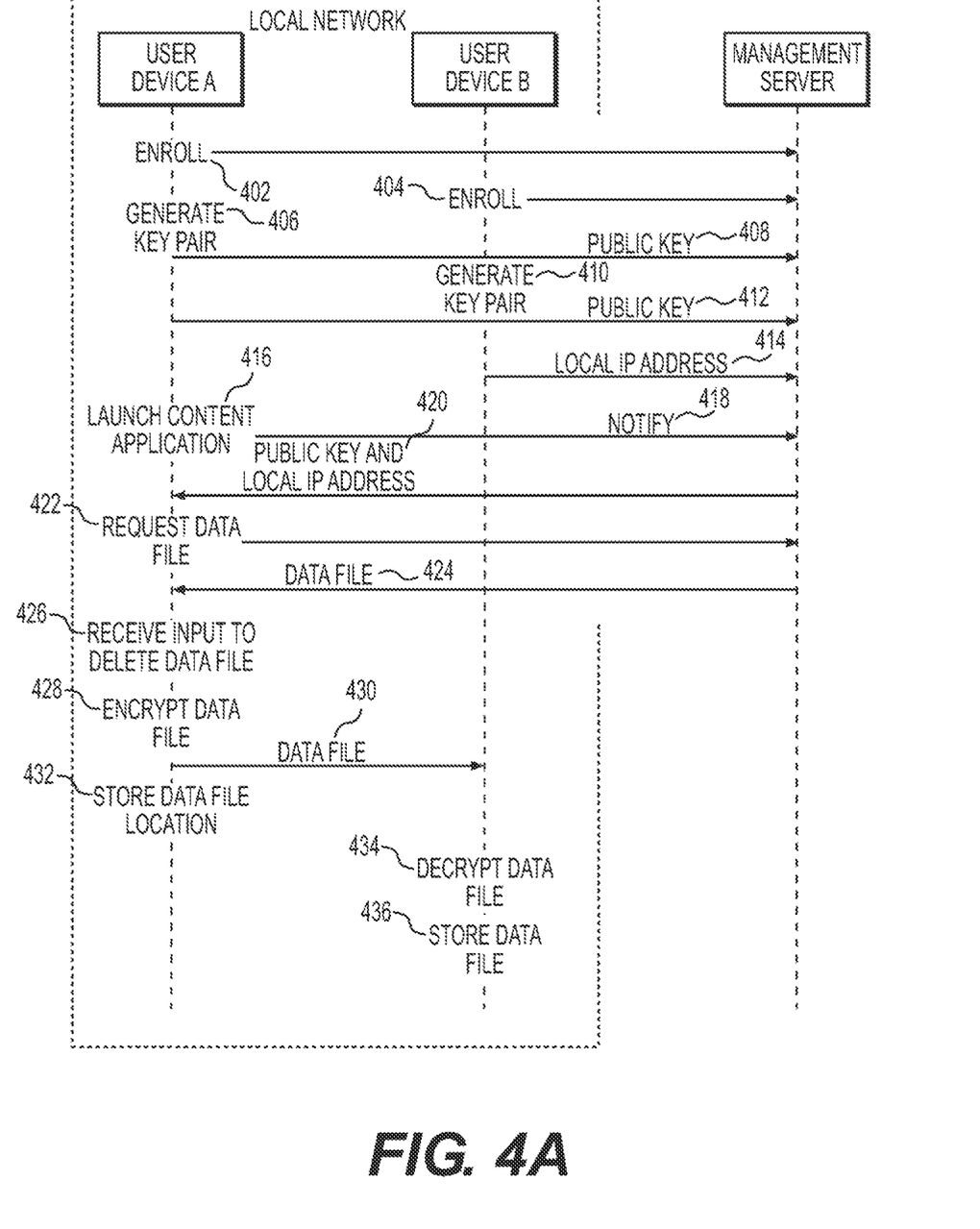
FIG. 4A is a sequence diagram of an example method for backing up confidential data to a user device on the same local network.
Figure 4B:
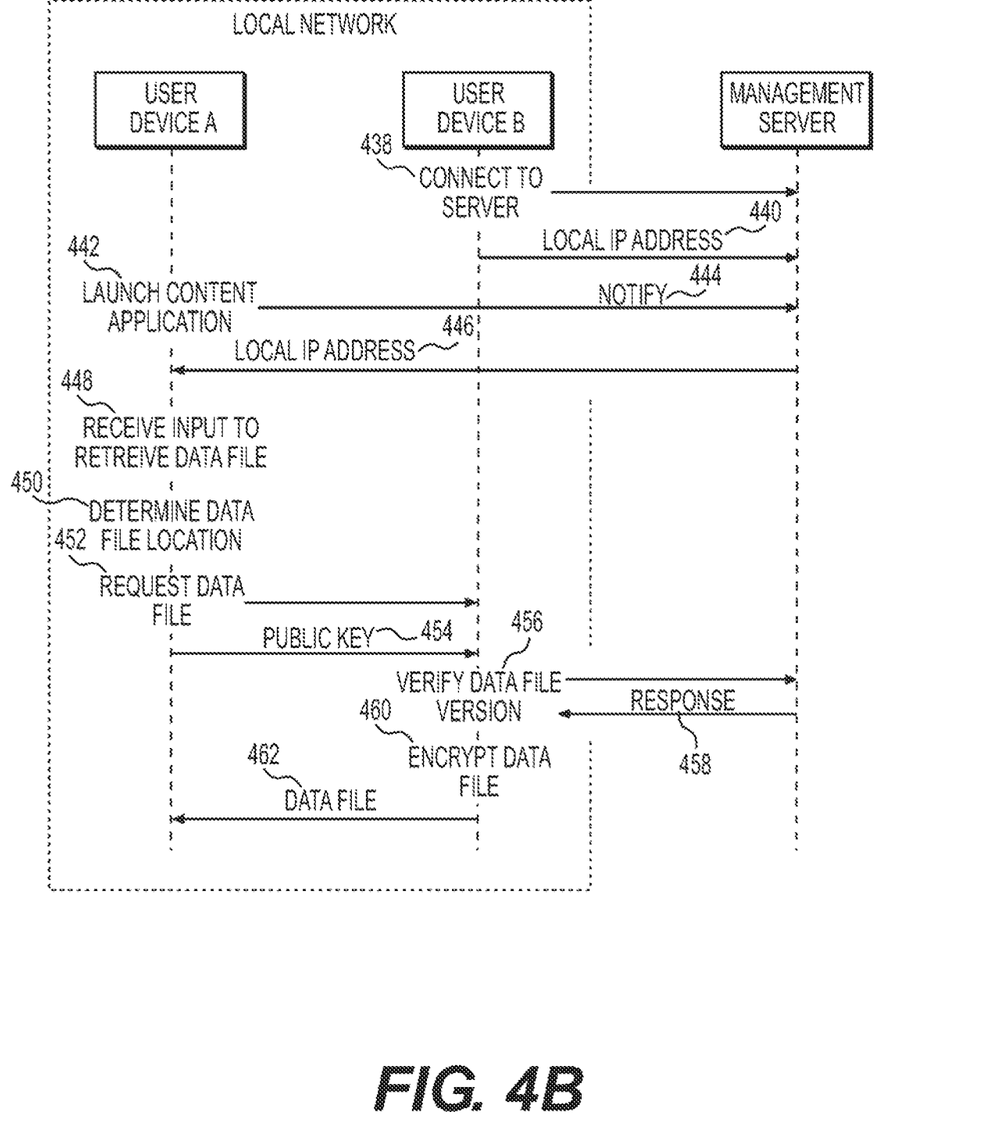
FIG. 4B is a sequence diagram of an example method for retrieving confidential data backed up to a user device on the same local network.

FIGS. 4A and 4B are sequence diagrams of an example method for backing up confidential data using user devices on the same local network. FIG. 4A includes stages for backing up confidential data from the user device A 110 to the user device B 120. FIG. 4B includes stages for the user device A 110 retrieving the backed up confidential data from the user device B 120. At stage 402, the user device A 110 can enroll with the management server 180. For example, the management server 180 can be part of a UEM system that allows enterprises to manage work-related applications and data on enrolled user devices. Users can enroll their own devices, such as cell phones, tablets, or laptops. Enrollment can include installing the management application 130A, 130B and other resources on the user device. The management server 180 can manage the user device A 110 by sending management instructions to the management application 130A. The management server 180 can also collect data associated with the user device A 110, such as a user profile and any user groups associated with the user device A 110.

At stage 404, the user device B 120 can enroll with the management server 180. In an example, both user devices A 110 and B 120 can belong to, or be associated with, the same user. The user can enroll the user device B 120 with the same user profile as the user device A 110. For example, the user can use the same credentials, such as the same username and password, when enrolling both devices. The management server 180 can then associate both user devices A 110 and B 120 with the user's profile.

At stage 406, the user device A 110 can generate an encryption key pair. The key pair can include the private key A 190 and the public key A 192 that are part of an asymmetric encryption protocol. At stage 408, the user device A 110 can send a public key A 192 to the management server 180. The user device A 110 can store the private key A 190 in a secure location on the user device A 110. The user device A 110 can generate the encryption keys and send the public key A 192 to the management server 180 at any time after enrolling or as part of the enrollment process at stage 402.

Similarly, at stage 410, the user device B 120 can generate an encryption key pair that includes the private key B 194 and the public key B 196. At stage 412, the user device B 120 can send the public key B 196 to the management server 180. The user device B 120 can store the private key B 194 in a secure location on the user device B 120. The user device B 120 can generate the encryption keys and send the public key B 196 to the management server 180 at any time after enrolling or as part of the enrollment process.

At stage 414, the user device B 120 can send its local IP address to the management server 180. For example, the user device B can be connected to the local network 160, and the local IP address can be the unique address that identifies the user device B 120 within the local network 160. The user device B 120 can send its local IP address when it establishes a connection with the management server 180 or at any time it is connected to the local network 160 upon request from the management server 180.

At stage 416, the user device A 110 can launch the content application 140A. The content application 140A can be an application managed by the management server 180 where users can store and manage enterprise content. The content application 140A is used merely as an example, and the user device A 110 can launch any managed application on the user device A 110 where a user can delete or back up a data file.

At stage 418, the user device A 110 can notify the management server 180 that the content application 140A launched on the user device A 110. In response, at stage 420, the management server 180 can send the public key B 196 and the local IP address of the user device B 120 to the user device A 110. In some examples, the management server 180 can send the public key B 196 and local IP address of the user device B 120 in response to a different event. The public key B 196 and the local IP address of the user device B 120 can be sent together or separately, depending on the example. For example, the management server 180 can send the local IP address of the user device B when the user device A 110 connects to the same local network 160 and connects to the management server 180. The management server 180 can determine that the user devices A 110 and B 120 are connected to the same local network 160 and share the local IP addresses of both devices with each other. In another example, the user device A 110 can scan the local network 160 for any user devices associated with the user to obtain the local IP address of the user device B 120.

In some examples, the management server 180 can send the public key B 196 before the content application 140A launches. For example, whenever the user enrolls a user device under his user profile, the user device can generate an encryption key pair, and the management server 180 can share the associated public key with other user devices enrolled under the same profile. Likewise, the management server 180 can also share the public keys of the user's other devices with the newly enrolled device. The user can then have the public keys of all his or her user devices on each user device so that they can securely communicate with each other. In one example, the management server 180 can send the public key 196 in response to the user deleting a file in the content application 140A.

At stage 422, the user device A 110 can request a data file from the management server 180. The data file can be any type of computer file, such as a .docx, .pdf, .mp4, .exe, or .jpg file. For example, the data file can be an enterprise-related document, email, or work ticket managed by the management server 180. At stage 424, the management server 180 can send the data file to the user device A 110. The management server 180 can send the data file over a network, such as the local network 160 if the management server 180 is also connected to the local network 160. Where the management server 180 is on a remote network, the management server 180 can send the data file over the Internet, such as by using a hypertext transfer protocol ("HTTP") or Application Programming Interface ("API") call.

At stage 426, the user device A 110 can receive input to delete the data file. For example, when the user is done using the data file, the user can select to delete the data file, such as by selecting the file and then selecting a delete button or trash can icon on an interface of the content application 140A.

At stage 428, the user device A 110 can encrypt the data file using the public key B 196. For example, instead of deleting the file, the content application 140A can be configured to encrypt the data file and, at stage 430, send it to the user device B 120 when the two devices are on the same local network 160.

At stage 432, the user device A 110 can store the location of the data file. For example, the content application 140A can record an event indicating that the data file is located at the user device B 120. In one example, the user device A 110 can notify the management server 180 that the data file was sent to the user device B 120.

At stage 434, the user device B 120 can decrypt the data file using the private key B 194. For example, because the user device A 110 encrypted the data file using the public key B 196, the private key B 194 can be the only encryption key that can decrypt the data file. At stage 436, the user device B 120 store the data file in the local storage 150B. In one example, the user device B 120 can store the data file on a secure or encrypted portion of the local storage 150B.

Moving now to FIG. 4B, at stage 438, the user device B 120 can connect to the management server 180 from the local network 160. The local network 160 described in FIG. 4B can be the same or different from the local network 160 from FIG. 4A above. For example, the local network 160 described above can be a home network and the local network 160 described below can be a work network. In another example, the local network 160 described above and below can both occur at a home network or work network. In one example, the user device A 110 can enroll at stage 402 while connected to a first local network 160, the user device B 120 can enroll at stage 404 while connected to a second local network 160, the user device A 110 can receive the data file at stage 424 on a third local network 160, the user device A 110 can send the data file to the user device B 120 at stage 430 while connected to a fourth local network 160, and, as described below, the user device B 120 can send the data file back to the user device A 110 at stage 460 on a fifth local network 160. In other words, the stages described in FIGS. 4A and 4B can occur on any combination of networks as long as the user devices A 110 and B 120 are connected to the same local network 160 when any network communications are exchanged between them.

At stage 440, the user device B 120 can send its current local IP address to the management server 180. The user device B 120 can do this when it connects to the management server 180 from the local network 160. In an example where the user device B 120 remains connected to the same local network 160 as described above in FIG. 4A, this stage may not occur.

At stage 442, the user device A 110 can launch the content application 140A. Like stage 416, the user can launch the content application 140A or another managed application on the user device A 110 that has the capability of managing enterprise data on the user device A 110.

At stage 444, the user device A 110 can notify the management server 180 that the content application 140A launched on the user device A 110. At stage 446, the management server 180 can send the local IP address of the user device B 120 to the user device A 110. In an example where both the user devices A 110 and B 120 are still connected to the same local network 160 as when the user device A 110 last received the local IP address of the user device B 120, stage 446 may not occur because the user device A 110 already has the local IP address.

At stage 448, the user device A 110 can receive input to retrieve the data file. For example, the user can perform an action that corresponds to downloading the data file from the management server 180, such as selecting a link or icon associated with the data file.

At stage 450, the user device A 110 can determine the location of the data file. In one example, the user device A 110 can check local logs to check whether an entry exists indicating that the user device A 110 had previously sent the data file to the user device B 120. In another example, the user device A 110 can send a request for the data file to the management server 180, and the management server 180 can check local records or a database for any event record indicating that the user device A 110 sent the data file to another user device for backup. If the management server 180 can determine that the file was sent to the user device B 120, for example, the management server 180 can send the local IP address of the user device B 120 to the user device A 110 if they are on the same local network 160.

At stage 452, the user device A 110 can request the data file from the user device B 120. For example, the user device A 110 can send a request through the network node 170 using the local IP address of the user device B 120. The network node 170 can relay the request to the user device B. At stage 454, the user device A 110 can send the public key A 192 to the user device B 120. This stage can occur at other times instead. For example, the management server 180 can provide the public key A 192 to the user device B 120 after both user devices are enrolled, after both user devices A 110 and B 120 connect to the same local network 160, or after the user device A 110 launches the content application 140A.

At stage 456, the user device B 120 can verify with the management server 180 that the version of the data file saved at the local storage 150B is the most current version. For example, in the time between the user device A 110 sending the data file to the user device B 120 at stage 430 and the user device A 110 requesting the data file at stage 452, an updated version of the data file may have become available. In an example, where the data file includes metadata indicating a version number, the user device B 120 can send the version number to the management server 180 to determine whether it is the most current version. At stage 458, the management server 180 can respond informing the user device B 120 of the result.

At stage 460, where the data file is the most current version, the user device B 120 can encrypt the data file using the public key A 192. At stage 462, the user device B 120 can send the data file to the user device A 110. In an example, the user device B 120 can send the encrypted data file to the user device A 110 using a local IP address of the user device A 110. The local IP address of the user device A 110 can be provided to the user device B 120 when the user device A 110 connects to the management server 180 through the local network 160, when the user launches the content application 140A, or when the user device A 110 requests the data file, as some examples. In one example, after receiving the data file, the user device A 110 can decrypt the data file using the private key A 190.

In one example, where the data file on the user device B 120 is not the most current version, the management server 180 can instruct the user device B 120 to delete the data file instead of encrypting it and sending it to the user device A 110. The management server 180 can then send the most recent version of the data file to the user device A 110. The management server 180 can also encrypt the new data file using the public key A 192.

The method described above can save computing resources of the management server 180 when the user requests to redownload a file deleted from the user device A 110. For example, because users typically have their user devices connected to the same network, the data file can be sent to the user device B 120 and retrieved from the user device B 120 if the user requests to redownload the file on the user device A 110. This utilizes unused space on the user device B 120 and saves network resources and resources on the management server 180 that would have been used to resend the data file to the user device A 110.

In one example, the user device A 110 can send a deleted or backed up data file to the user device B 120 only when certain conditions are met. These conditions can be based on various factors, such as the device type or the size of the local storages 150A and 150B. For example, personal computers typically have more storage space than mobile devices like tablets and smart phones. In one example, the user device A 110 can send the data file to the user device B 120 when, as some examples, the user device A 110 is a mobile device and the user device B 120 is a personal computer, or when the user device A 110 has below a first threshold size of local storage 150A and the user device B 120 has above a second threshold size of local storage 150B.

Figure 5:
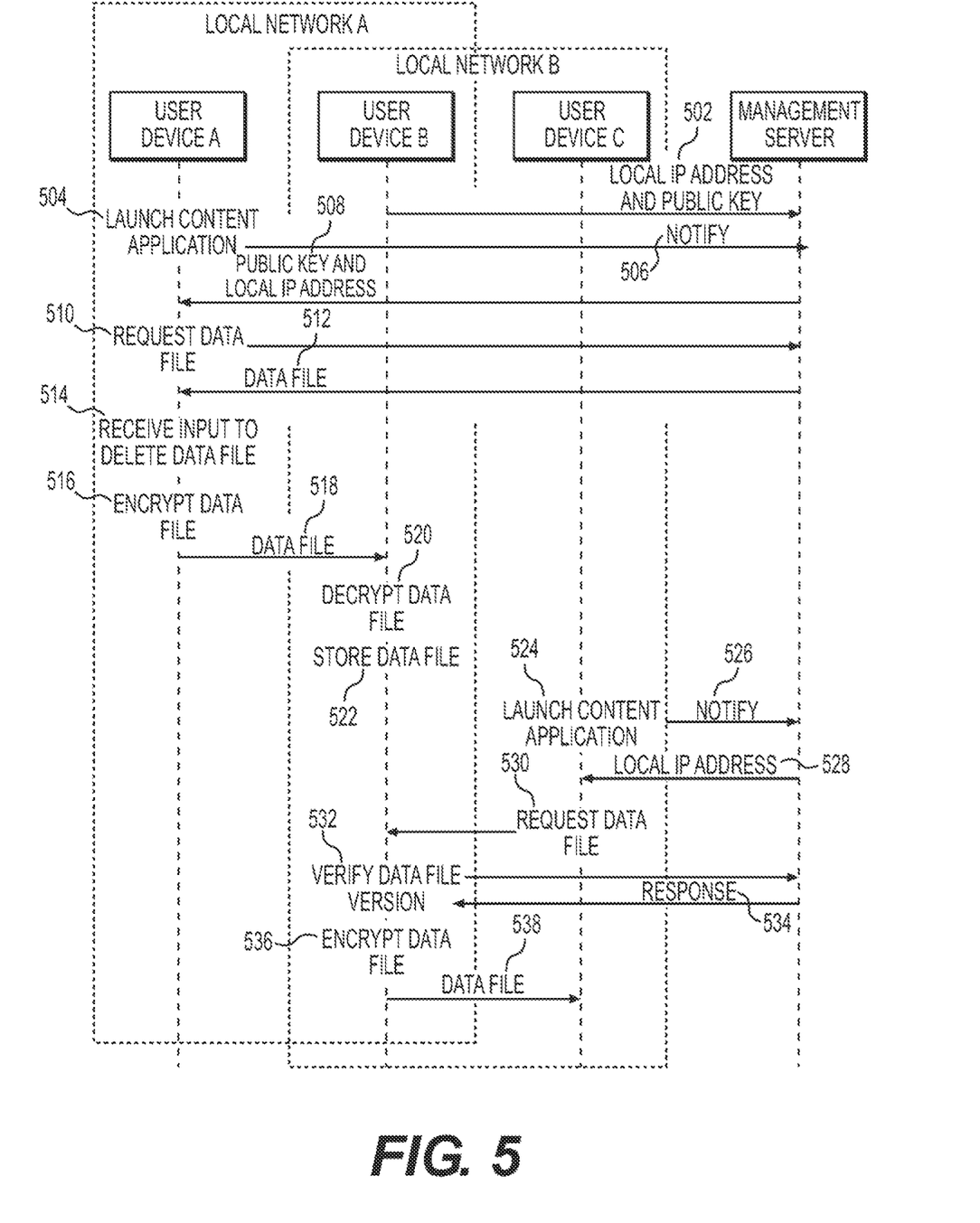
FIG. 5 is a sequence diagram of another example method for backing up and retrieving confidential data using user devices on the same local network.

FIG. 5 is a sequence diagram of another example method for backing up confidential data using user devices on the same local network 160. The example method illustrated in FIG. 5 includes a third user device, like the user device C described previously herein. The user device C can also be enrolled with a management application under the same user profile as user devices A 110 and B 120. As shown in FIG. 5, user devices A 110 and B 120 are a part of a local network A and user devices B 120 and C are part of a local network B. That does not necessarily mean that the user device B 120 is connected to both local networks B and C simultaneously. Rather, the user device B 120 can be connected to the local network A for the stages related to the user device A 110 (stages 502, 504, 508, 510, 512, 514, 516, 518, 520, and 522) and connected to the local network B for the stages related to the user device C (stages 524, 526, 528, 530, 532, 534, 536, 538, and 538). In one example, the local networks A and B can be the same local network, like the local network 160.

At stage 502, the user device B 120 can send its local IP address and the public key B 196 to the management server 180. The public key B 196 and the local IP address of the user device B 120 can be sent together or separately, depending on the example. For example, the management server 180 can send the local IP address of the user device B when the user device A 110 connects to the same local network 160 and connects to the management server 180. The management server 180 can determine that the user devices A 110 and B 120 are connected to the same local network 160 and share the local IP addresses of both devices with each other. In another example, the user device A 110 can scan the local network 160 for any user devices associated with the user to obtain the local IP address of the user device B 120.

In some examples, the management server 180 can send the public key B 196 when the user enrolls a user device as part of the enrollment process. In one example, the management server 180 can distribute public keys of user devices enrolled under the same user profile to the other user devices enrolled that user profile. In one example, the management server 180 can send the public key 196 in response to the user deleting a file in the content application 140A as described below.

At stage 504, the user device A 110 can launch the content application 140A. The content application 140A can be an application managed by the management server 180 where users can store and manage enterprise content. The content application 140A is used merely as an example, and the user device A 110 can launch any managed application on the user device A 110 where a user can delete or back up a data file.

At stage 506, the user device A 110 can notify the management server 180 that the content application 140A launched on the user device A 110. In response, at stage 508, the management server 180 can send the public key B 196 and local IP address of the user device B 120 to the user device A 110. In some examples, the management server 180 can send the public key B 196 and local IP address of the user device B 120 in response to a different event. The public key B 196 and the local IP address of the user device B 120 can be sent together or separately, depending on the example. For example, the management server 180 can send the local IP address of the user device B when the user device A 110 connects to the same local network 160 and connects to the management server 180. The management server 180 can determine that the user devices A 110 and B 120 are connected to the same local network 160 and share the local IP addresses of both devices with each other. In another example, the user device A 110 can scan the local network 160 for any user devices associated with the user to obtain the local IP address of the user device B 120.

At stage 510, the user device A 110 can request a data file from the management server 180. The data file can be any type of computer file, such as a .docx, .pdf, .mp4, .exe, or .jpg file. For example, the data file can be an enterprise-related document, email, or work ticket managed by the management server 180. At stage 512, the management server 180 can send the data file to the user device A 110. The management server 180 can send the data file over a network, such as the local network 160 if the management server 180 is also connected to the local network 160. Where the management server 180 is on a remote network, the management server 180 can send the data file over the Internet, such as by using an HTTP or API call.

At stage 514, the user device A 110 can receive input to delete the data file. For example, when the user is done using the data file, the user can select to delete the data file, such as by selecting the file and then selecting a delete button or trash can icon on an interface of the content application 140A.

At stage 516, the user device A 110 can encrypt the data file using the public key from the user device B 120. For example, instead of deleting the file, the content application 140A can be configured to encrypt the data file and, at stage 518, send it to the user device B 120 when the two devices are on the same local network 160.

At stage 520, the user device B 120 can decrypt the data file using the private key B 194. For example, because the user device A 110 encrypted the data file using the public key B 196, the private key B 194 can be the only encryption key that can decrypt the data file. At stage 522, the user device B 120 store the data file in the local storage 150B. In one example, the user device B 120 can store the data file on a secure or encrypted portion of the local storage 150B.

At stage 524, the user device C can launch the content application 140. The content application 140 on the user device C can be the same or different as the content application 140A from stage 504. For example, the content application 140A on the user device A 110 can be a word document application and the content application 140 on the user device C can be an email application, so long as both are managed by the management server 180.

At stage 526, the user device C can notify the management server 180 that the content application 140 launched on the user device C. At stage 528, the management server 180 can send the local IP address of the user device B 120 to the user device C. Although this stage is described as happening after the user device C notifies the management server 180, the management server 180 can send the local IP address at another time. For example, the management server 180 can send the local IP address of the user device B when the user device C connects to the same local network 160 and connects to the management server 180. The management server 180 can determine that the user devices B 120 and C are connected to the same local network 160 and share the local IP addresses of both devices with each other. In another example, the user device C can scan the local network 160 for any user devices associated with the user to obtain the local IP address of the user device B 120.

At stage 530, the user device C can request the data file from the user device B 120 over the local network B. For example, the user can request the data file from the user device C. The user device C can send the request to the management server 180 and the management server 180 can determine that the data file was previously sent to the user device B 120 from the user device A 110. Instead of using computing and network resources to send the data file, the management server 180 can instruct the user device C to retrieve the data file from the user device B 120. The user device C can then send the data file request to the user device B 120 through the network node 170 using the local IP address of the local device B 120.

At stage 532, the user device B 120 can verify with the management server 180 that the version of the data file saved at the local storage 150B is the most current version. For example, in the time between the user device A 110 sending the data file to the user device B 120 at stage 518 and the user device C requesting the data file at stage 530, an updated version of the data file may have become available. In an example, where the data file includes metadata indicating a version number, the user device B 120 can send the version number to the management server 180 to determine whether it is the most current version. In one example, the user device C can request the data file from the management server 180 at stage 530 and the management server 180 can then check on whether the version sent from the user device A 110 to the user device B 120 is current.

At stage 534, the management server 180 can respond informing the user device B 120 of the result. If the version is not current, the management server 180 can send the data file to the user device C. The management server 180 can also send instructions to the user device B 120 to delete the corresponding data file because the version on the user device B 120 is no longer current. In another example, the user device C can send the updated version of the file to the user device B 120 so that it can be retrieved later on the user device B 120 or any other user device associated with the user.

At stage 536, the user device B 120 can encrypt the data file using a public key from the user device C. For example, the user device C can send a public key of its own encryption key pair to the user device B 120. The user device C can do this when it connects to the same network as the user device B 120, after enrolling using the same profile, or when it requests the data file, as some examples. In one example, the public key can be provided collected from the user device C and provided to the user device B 120 by the management server 180.

At stage 538, the user device B 120 can send the encrypted data file to the user device C over the local network B. For example, the user device B 120 can send the data file through the network node 170 using the local IP address of the user device C. In one example, the user device B 120 can receive the local IP address of the user device C from the management server 180. Alternatively, the user device C can send its local IP address to the user device B 120, such as when it sends the request for the data file.

The method described above regarding FIG. 5 can allow a user to distribute, back up, delete, and retrieve data files using the local storage 150 of the user devices and the network resources of the local network 160 instead of the enterprise network and computing resources. This can free up important enterprise network and computing resources to perform more important functions.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for backing up a data file between devices of a same user, comprising:
   receiving, at a first user device, instructions to delete the data file, the data file being stored locally at the first user device;
   receiving, at the first user device from a server, a local Internet Protocol ("IP") address and a first public encryption key associated with a second user device, the second user device being associated with the same user as the first user device;
   encrypting the data file using the first public encryption key;
   sending the encrypted data file from the first user device to the second user device over a local network using the local IP address of the second user device;
   deleting, at the first user device, the data file;
   receiving, at a third user device, instructions to retrieve the data file;
   sending, from the third user device to the second user device, a request to retrieve the data file using the local IP address; and
   receiving, at the third user device from the second user device, the data file.

2. The method of claim 1, further comprising receiving, from the server, an updated local IP address associated with the second user device prior to sending the request to retrieve the data file, wherein the request is sent using the updated local IP address.

3. The method of claim 1, wherein the instructions to delete the data file and the instructions to retrieve the data file are both received from user input.

4. The method of claim 1, wherein the data file is received in an encrypted format, the data file having been encrypted using a second public encryption key, and wherein the method further comprises decrypting the data file using a private key associated with the second public encryption key.

5. The method of claim 1, wherein the first user device, second user device, and third user device are enrolled in a Unified Endpoint Management system under the same user profile.

6. The method of claim 1, wherein sending the encrypted data file to the second user device occurs over a first local network, and receiving the data file from the second user device occurs on a second local network.

7. A non-transitory, computer-readable medium containing instructions that, when executed by a hardware-based processor, performs stages for backing up a data file between devices of a same user, the stages comprising:
   receiving, at a first user device, instructions to delete the data file, the data file being stored locally at the first user device;
   receiving, at the first user device from a server, a local Internet Protocol ("IP") address and a first public encryption key associated with a second user device, the second user device being associated with the same user as the first user device;
   encrypting the data file using the first public encryption key;
   sending the encrypted data file from the first user device to the second user device over a local network using the local IP address of the second user device;
   deleting, at the first user device, the data file;
   receiving, at a third user device, instructions to retrieve the data file;
   sending, from the third user device to the second user device, a request to retrieve the data file using the local IP address; and
   receiving, at the third user device from the second user device, the data file.

8. The non-transitory, computer-readable medium of claim 7, the stages further comprising receiving, from the server, an updated local IP address associated with the second user device prior to sending the request to retrieve the data file, wherein the request is sent using the updated local IP address.

9. The non-transitory, computer-readable medium of claim 7, wherein the instructions to delete the data file and the instructions to retrieve the data file are both received from user input.

10. The non-transitory, computer-readable medium of claim 7, wherein the data file is received in an encrypted format, the data file having been encrypted using a second public encryption key, and wherein the stages further comprise decrypting the data file using a private key associated with the second public encryption key.

11. The non-transitory, computer-readable medium of claim 7, wherein the first user device, second user device, and third user device are enrolled in a Unified Endpoint Management system under the same user profile.

12. The non-transitory, computer-readable medium of claim 7, wherein sending the encrypted data file to the second user device occurs over a first local network, and receiving the data file from the second user device occurs on a second local network.

13. A system for backing up a data file between devices of a same user, comprising:
   a memory storage including a non-transitory, computer-readable medium comprising instructions; and
   a computing device including a hardware-based processor that executes the instructions to carry out stages comprising:
      receiving, at a first user device, instructions to delete the data file, the data file being stored locally at the first user device;
      receiving, at the first user device from a server, a local Internet Protocol ("IP") address and a first public encryption key associated with a second user device, the second user device being associated with the same user as the first user device;
      encrypting the data file using the first public encryption key;
      sending the encrypted data file from the first user device to the second user device over a local network using the local IP address of the second user device;
      deleting, at the first user device, the data file;
      receiving, at a third user device, instructions to retrieve the data file;
      sending, from the third user device to the second user device, a request to retrieve the data file using the local IP address; and
      receiving, at the third user device from the second user device, the data file.

14. The system of claim 13, the stages further comprising receiving, from the server, an updated local IP address associated with the second user device prior to sending the request to retrieve the data file, wherein the request is sent using the updated local IP address.

15. The system of claim 13, wherein the instructions to delete the data file and the instructions to retrieve the data file are both received from user input.

16. The system of claim 13, wherein the data file is received in an encrypted format, the data file having been encrypted using a second public encryption key, and wherein the stages further comprise decrypting the data file using a private key associated with the second public encryption key.

17. The system of claim 13, wherein the first user device, second user device, and third user device are enrolled in a Unified Endpoint Management system under the same user profile.

* * * * *